Figure 1:
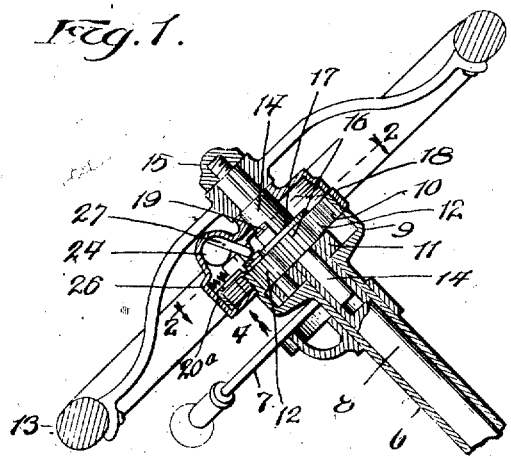

E. E. DAVIS.
LOCKING DEVICE FOR AUTOMOBILES.
APPLICATION FILED SEPT. 28, 1916.

1,205,124. Patented Nov. 14, 1916.

Inventor:
Edward E. Davis,
by Charles O. Shervey,
his attorney.

UNITED STATES PATENT OFFICE.

EDWARD E. DAVIS, OF CHICAGO, ILLINOIS.

LOCKING DEVICE FOR AUTOMOBILES.

1,205,124.  Specification of Letters Patent.  Patented Nov. 14, 1916.

Application filed September 28, 1916. Serial No. 122,640.

*To all whom it may concern:*

Be it known that I, EDWARD E. DAVIS, a citizen of the United States, and a resident of Chicago, county of Cook, and State of Illinois, have invented certain new and useful Improvements in Locking Devices for Automobiles, of which the following is declared to be a full, clear, and exact description.

This invention relates to locking devices for automobiles and other motor vehicles.

One object is to provide improved means in steering mechanism for disconnecting the steering wheel from the steering post.

Another object is to provide lock-controlled means for preventing access to the housing of the planetary gear mechanism.

With these and other objects in view, this invention consists in the several novel features of construction, arrangement and combination of parts hereinafter fully described and claimed.

The invention is clearly illustrated in the drawing accompanying this specification, in which:—

Figure 4:
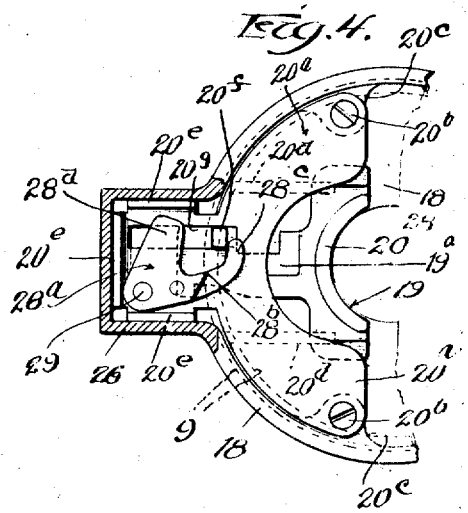
Figure 2:
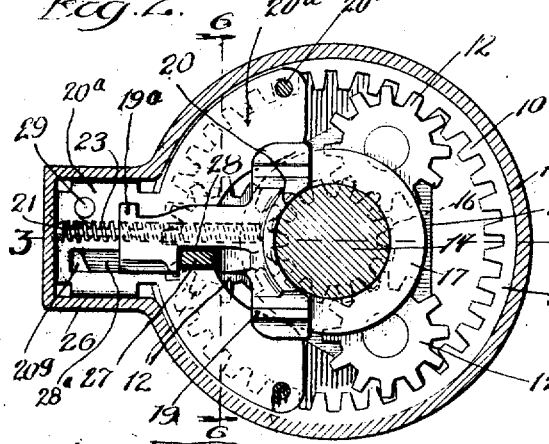
Figure 5:
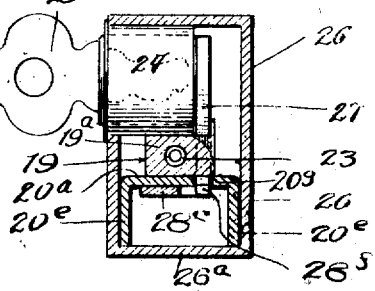
Figure 3:
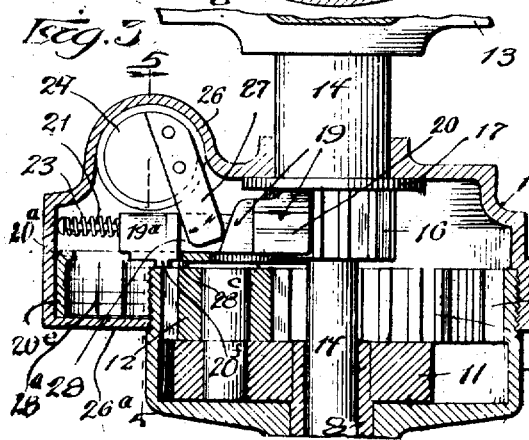
Figure 6:
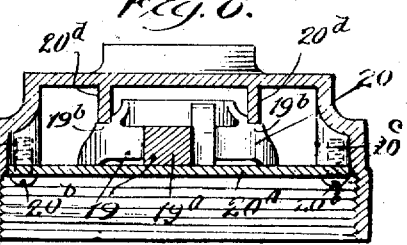

Figure 1, is a central longitudinal section through a fragment of a steering column, a steering post therein and a steering wheel with my improved locking mechanism applied thereto; Fig. 2, is a transverse section taken on the line 2—2 of Fig. 1; Fig. 3, is a vertical section taken on the line 3—3 of Fig. 2; but showing the steering wheel in its disconnected position with respect to the steering post; Fig. 4 is a fragmental view of the cap portion of the lock casing showing certain elements of the locking mechanism, the view being taken in the direction indicated by the arrow 4 in Fig. 1; Fig. 5 is a detail vertical section taken on the line 5—5 of Fig. 3 and Fig. 6 is a detail vertical section taken on the line 6—6 of Fig. 2.

Referring to said drawing, which illustrates a simple embodiment of the present invention, 6, designates the steering column or standard of a motor vehicle steering gear of simple and well known construction; 7, designates one of the control levers and 8, the steering post, which in accordance with the common and well known practice is operatively connected with the front steering wheels of the vehicle. Supported upon the upper end of the column or standard 6, is a housing 9, threaded upon its outer side and formed upon its inner side with an internal rack 10. Upon the upper end of the steering post 8, is rigidly fastened a pinion support 11, upon which are journaled pinions 12, that mesh with the internal rack 10 of the housing 9. The steering wheel 13, has a downwardly extending stud shaft 14, which is keyed to the steering wheel and secured thereon by a nut 15, threaded upon a reduced upper end of the stud shaft 14. Rigidly mounted upon said stud shaft 14, is a pinion 16, which is adapted to mesh with the pinions 12 and which is also capable of being demeshed therefrom by lifting or moving the steering wheel lengthwise of the steering post. The pinion 16, pinions 12, internal rack 10 and pinion support 11, form a planetary gear connection between the steering wheel 13 and steering post 8 so as to effect a differential movement between the steering wheel and steering post, as is common and well known to those skilled in this art. On the stud shaft 14, immediately above the pinion 16, is rigidly secured a flange 17 of larger diameter than the pinion 16, which flange is adapted to coöperate with certain mechanism for holding the pinion 16 in meshed or demeshed condition with the pinions 12.

Threaded upon the housing 9, is a cover or cap 18, and said cap has a central opening in its upper side, through which the stud shaft 14 projects into the interior of the cap and housing 9. The lower end of the stud shaft 14, is reduced in diameter and is rotatively mounted in the steering post 8. Slidably mounted in said cover or cap 18, is a lock bolt 19, which has a shoulder 20, adapted to project over the flange 17, whenever the pinions 12, 16, are in mesh, to thereby hold said pinions in mesh and also to prevent the steering wheel from being moved lengthwise of the steering post. Said lock bolt is also arranged to underlie the flange 17, whenever the steering wheel is pulled upward and to thereby hold the pinions 16, 12, in demeshed condition. In the form shown in the drawing, said lock bolt rests upon a plate 20ª, which is fastened to the cap or cover 18, by screws 20ᵇ, secured in lugs 20ᶜ, formed on the inner face of the cover or cap 18, and said lock bolt is spring-pressed toward the stud shaft 14, by a coiled compression spring 23, which surrounds a pin 21, and extends into a socket formed in the shank or stem portion 19ª, of the lock bolt. The outer ends of the shouldered portion 20, of the lock bolt, are formed with notches 19ᵇ, and ribs 20ᵈ, projecting down from the top or cover of the casing, extend into said notches and guide the lock bolt in its movements to and from the stud shaft.

Locking mechanism 24, is provided for actuating the lock bolt 19, and locking it in its active position above or below the flange 17 and obviously any sort of tumbler locking mechanism may be employed. In the drawing, an ordinary pin cylinder tumbler lock is employed, which is operated by a key 25; said locking mechanism is mounted in a recessed portion 26, of the cover or cap 18, and one of the tumblers of the locking mechanism has an arm 27, connected therewith, which enters a notch 28, formed in the shank or stem of the lock bolt 19, whereby the rotatorial movement of the tumblers and arm 27, may be translated into a reciprocatory movement of the lock bolt.

The lock bolt supporting plate 20$^a$, extends back into the recessed portion 26, of the cover or cap and has downturned edge portions 20$^e$, that fit between the side and end walls of said recessed portion 26, and rest upon the bottom 26$^a$, of the recessed portion 26. A pawl or detent 28$^a$, is pivoted at one end upon a pin 29, secured to the plate 20$^a$, and said pawl or detent has a sharp edge 28$^b$, adapted to impinge against the threaded portion of the housing 9, whenever the cover or cap is turned in a direction to unscrew the same from the housing. The pawl or detent 28$^a$, is preferably made of a plurality of case-hardened sheet metal pieces, riveted together for the purpose of strength and obtaining a hard pawl at a minimum cost. The pawl has one arm 28$^c$, which lies in the path of a downwardly projecting lug 20$^f$, formed upon the underside of the shank of the lock bolt, which lug projects down through a slot 20$^x$, and said pawl has a second arm 28$^d$, which also lies in the path of movement of the lug 20$^f$, the arrangement being such that when the lock bolt is moved into its position above or below the flange 17, the lug, 20$^f$, engages the arm 28$^c$, and swings the pawl into position where its sharp edge 28$^b$, impinges against the screw threaded end of the housing 9, the result being that any attempt to unscrew the cap or cover from said housing will result in the pawl biting into the threaded end and preventing removal of the cover or cap. When, however, the lock bolt is retracted, the lug 20$^f$, engages the arm 28$^d$, of the pawl and swings the sharp edge thereof out of engagement with the housing 9. The cover or cap may thereupon be readily unscrewed from the housing 9.

In operation the pinion 16, when in meshed condition with the pinions 12, operated by turning the steering wheel. This position is best seen in Fig. 1, and at such time the lock bolt overlies the flange 17, of the stud shaft, and holds the gears in mesh. To disconnect the steering wheel and its stud shaft from the steering post, and thereby make it impossible to steer the vehicle from the steering wheel, the lock is first operated by the key fitting the same and the tumblers given partial rotation in a direction to thereby retract the lock bolt from its position underneath the flange 17. In this position the steering wheel may be lifted to demesh the pinion 16 from the pinions 12, whereby the flange 17, of the stud shaft is brought into a position above the lock bolt, as clearly shown in Fig. 3, whereupon the key may be turned to move the lock bolt toward the stud shaft with its shouldered end underlying the flange 17. thereby supporting the steering wheel, stud shaft and post and holding the pinion 16, out of mesh with the pinions 12. The steering wheel may now be turned without turning the steering post, thus making it impossible to drive away the vehicle without first retracting the lock bolt from underneath the flange and moving the pinion 16 into mesh with the pinions 12. Furthermore, by reason of the engagement of the pawl 28$^a$, with the threaded end of the collar 9, an unauthorized person cannot unscrew the cover from the housing. To operatively connect the steering wheel with the steering post, the proper key is inserted in the lock, the tumblers turned in the proper direction, thereby retracting the lock bolt from underneath the flange 17, after which the steering wheel is lowered, bringing the pinion 16 into mesh with the pinions 12, after which the key is turned in the direction to bring the lock bolt back to its operative position.

When the steering wheel is disconnected from the steering post, the vehicle cannot be driven away because of the disconnected steering wheel. The vehicle may, however be moved slowly if the front wheels themselves are manipulated in steering the vehicle. In this way, it may be moved from one position to another, in case of fire or in case it otherwise obstructs the traffic, thus complying with many of the laws relating to motor vehicles.

The cap of the housing cannot be removed until the stud shaft and steering wheel are moved upward, so that the pinion 16 is above the plane of the other gears of the planetary mechanism, and before this removal can be accomplished the lock pawl must be operated.

I do not herein claim the locking device for locking the steering wheel in operativ More or less variation in the exact details of construction is possible without departing from the spirit of this invention, and I desire, therefore, not to limit myself to the exact form of construction shown and described, but intend in the following claims to point out all of the invention disclosed herein.

I claim as new and desire to secure by Letters Patent:—

1. A locking device for motor vehicles, comprising a steering column having an externally screw-threaded housing secured thereon, a cover for said housing, threaded thereon, a pawl pivotally supported by said cover and having a sharp edge adapted to impinge against the threads on the housing, a reciprocal element supported in said cover and having a lug adapted to engage said pawl and capable of moving it into and out of engagement with the threads on the housing, and key controlled mechanism for reciprocating said reciprocatory element.

2. In a locking device for motor vehicles, a steering column having an externally screw-threaded housing secured upon its upper end, a cover threaded on said housing, a locking pawl consisting of a plurality of case hardened sections secured together and having an edge adapted to impinge upon the screw threads on the housing, a reciprocal element, slidably mounted in said cover, and having a lug adapted to engage said pawl and capable of moving it into and out of engagement with said screw threads on the housing, and key controlled locking mechanism for reciprocating said reciprocatory element.

3. In a steering head for an automobile the combination with a steering post, fixed against lengthwise movement, a housing mounted relatively to said post, a planetary gearing in said housing, of a stud shaft, a steering wheel on said stud shaft, a pinion fixed to said stud shaft, said stud shaft being mounted for lengthwise movement relatively to the steering post, whereby the said pinion may be meshed and demeshed with said planetary gearing, and a cap for said housing, the top of which is spaced from the gearing to permit of the lengthwise movement of the stud shaft and its pinion.

4. In a steering head for an automobile, the combination with a steering post fixed against lengthwise movement, a housing mounted concentric with said post, a planetary gearing in said housing, of a stud shaft mounted to move lengthwise, and means operated by the endwise movement of the stud shaft whereby the planetary gearing may be operative or inoperative according to the position of said stud shaft, and a cap for said housing the top of which is spaced from the gearing to permit the lengthwise movement of said stud shaft, a flange carried by the shaft and positioned above the pinion to limit the endwise movement of the stud shaft.

5. In a steering head for an automobile; the combination with a steering post fixed against lengthwise movement, a housing mounted concentric with said post, a planetary gearing in said housing, of a stud shaft mounted to move lengthwise, and means operated by the endwise movement of the stud shaft whereby the planetary gearing may be operative or inoperative according to the position of said stud shaft, and a cap for said housing the top of which is spaced from the gearing to permit the lengthwise movement of said stud shaft, means carried by the shaft to limit the endwise movement of the shaft in both directions.

6. A locking device for automobiles comprising a steering column, an externally screw threaded housing threaded thereon, a steering post within said column a steering wheel, a stud shaft secured to said wheel and having operative connection with said steering post but independently movable relative to said steering post, a pawl carried by the cover and adapted to impinge against the threads of the housing, a bolt and means operated by said bolt, to move the said pawl from engagement with said threads.

7. A locking device for automobiles comprising a steering column, an externally screw threaded housing concentrically mounted on said column, a cover for said housing threaded thereon, a steering post within said column, a steering wheel, a stud shaft secured to said wheel and having operative connection with said steering post, but independently movable relative to said steering post, a pawl carried by the cover and adapted to impinge against the threads of the housing, a bolt, and means operated by said bolt, to move the said pawl from engagement with said threads.

8. A locking device for automobiles comprising a steering column, an externally screw threaded housing concentrically mounted on said column, a cover for said housing threaded thereon, a steering post within said column, a steering wheel, a stud shaft secured to said wheel and having operative connection with said steering post, a pawl carried by the cover and adapted to impinge against the threads of the housing, a bolt, and means operated by said bolt, to move the said pawl from and into engagement with said threads.

EDWARD E. DAVIS.